US011126176B2

United States Patent
Sakamoto et al.

(10) Patent No.: US 11,126,176 B2
(45) Date of Patent: Sep. 21, 2021

(54) VEHICLE CONTROL APPARATUS

(71) Applicant: HITACHI AUTOMOTIVE SYSTEMS, LTD., Hitachinaka (JP)

(72) Inventors: Hideyuki Sakamoto, Hitachinaka (JP); Akio Ikeya, Hitachinaka (JP); Masayuki Kawabata, Hitachinaka (JP); Hirotaka Amo, Hitachinaka (JP)

(73) Assignee: HITACHI AUTOMOTTVE SYSTEMS, LTD., Hitachinaka (JP)

( * ) Notice: Subject to any disclaimer, the term of this patent is extended or adjusted under 35 U.S.C. 154(b) by 311 days.

(21) Appl. No.: 16/324,115

(22) PCT Filed: Jul. 4, 2017

(86) PCT No.: PCT/JP2017/024428
§ 371 (c)(1),
(2) Date: Feb. 7, 2019

(87) PCT Pub. No.: WO2018/030032
PCT Pub. Date: Feb. 15, 2018

(65) Prior Publication Data
US 2019/0179310 A1 Jun. 13, 2019

(30) Foreign Application Priority Data

Aug. 10, 2016 (JP) .............................. JP2016-158042

(51) Int. Cl.
*G05D 1/00* (2006.01)
*B60W 50/023* (2012.01)
(Continued)

(52) U.S. Cl.
CPC ....... *G05D 1/0077* (2013.01); *B60R 16/0232* (2013.01); *B60W 50/023* (2013.01);
(Continued)

(58) Field of Classification Search
CPC ....... B60W 2050/0295; B60W 50/023; B60W 50/029; B60W 50/082; B60W 50/087;
(Continued)

(56) References Cited

U.S. PATENT DOCUMENTS 5,987,365 A    11/1999   Okamoto
6,356,821 B1 *   3/2002   Yoshida .................. G05B 9/02
                                                             123/333
(Continued)

FOREIGN PATENT DOCUMENTS

JP    S52-137233 A    11/1977
JP    S61-72302 A    4/1986
(Continued)

OTHER PUBLICATIONS

Extended European Search Report issued in corresponding European Patent Application No. 17839106.6 dated Aug. 19, 2020.
(Continued)

*Primary Examiner* — Tyler J Lee
(74) *Attorney, Agent, or Firm* — Foley & Lardner LLP

(57) ABSTRACT

A vehicle control apparatus can continue a control function against abnormality in operation of an arithmetic processor and in the power supply voltage, and capable of improving reliability. Where there is no abnormality, the autonomous travel control unit and an auxiliary control unit calculate control instruction values for automatic driving control, and validate a CAN communication circuit of autonomous travel control units while invalidating a CAN communication circuit of the auxiliary control unit. Where an abnormality occurs in the autonomous travel control unit and not the auxiliary control unit, the CAN communication circuit of the autonomous travel control unit is invalidated and the CAN communication circuit of the auxiliary control unit is validated. Where the auxiliary control unit has no abnormality (Continued)

when the autonomous travel control unit has an abnormality during automatic driving control thereof, seamless automatic driving control with substantially no time lag continues.

19 Claims, 3 Drawing Sheets

(51) Int. Cl.
  *G05B 9/02* (2006.01)
  *B60R 16/02* (2006.01)
  *G05D 1/08* (2006.01)
  *G07C 5/04* (2006.01)
  *B60R 16/023* (2006.01)

(52) U.S. Cl.
  CPC ............. *G05B 9/02* (2013.01); *G05D 1/0088* (2013.01); *G07C 5/04* (2013.01)

(58) Field of Classification Search
  CPC .. B60W 60/0051; B60R 16/0232; G05B 9/02; G05D 1/0077; G05D 1/0088; G07C 5/04
  See application file for complete search history.

(56) References Cited

U.S. PATENT DOCUMENTS

| | | | |
|---|---|---|---|
| 9,573,682 B2* | 2/2017 | Heusinger | G05D 1/0011 |
| 9,891,688 B2* | 2/2018 | Armbruster | H04L 67/12 |
| 10,025,307 B2* | 7/2018 | Downey | H05K 3/32 |
| 2001/0044688 A1* | 11/2001 | Okita | B60W 50/029 |
| | | | 701/92 |
| 2011/0129356 A1* | 6/2011 | Kobayashi | F04C 2/102 |
| | | | 417/44.1 |
| 2014/0188322 A1 | 7/2014 | Oh et al. | |
| 2015/0142244 A1* | 5/2015 | You | B60W 60/0053 |
| | | | 701/23 |
| 2015/0344039 A1 | 12/2015 | Amoh et al. | |
| 2017/0144704 A1* | 5/2017 | Robinson | B60Q 9/00 |

FOREIGN PATENT DOCUMENTS

| | | |
|---|---|---|
| JP | H09-66832 A | 3/1997 |
| JP | H09-160643 A | 6/1997 |
| JP | H11-053207 A | 2/1999 |
| JP | 2015-063158 A | 4/2015 |
| JP | 2015-093498 A | 5/2015 |

OTHER PUBLICATIONS

International Search Report with English translation and Written Opinion issued in corresponding application No. PCT/JP2017/024428 dated Oct. 31, 2017.

* cited by examiner

| STATE | FIRST ECU | | SECOND ECU | | GATE LOGIC | | CAN COMMUNICATION CIRCUIT OUTPUT | |
|---|---|---|---|---|---|---|---|---|
| | ABNORMALITY FLAG 11p | | ABNORMALITY FLAG 12p | | 11f (OR OUTPUT) | 12g (NAND OUTPUT) | 11c | 12c |
| A | Low | NORMAL | Low | NORMAL | Low | High | VALID | INVALID |
| B | High | ABNORMAL | Low | NORMAL | High | Low | INVALID | VALID |
| C | Low | NORMAL | High | ABNORMAL | Low | High | VALID | INVALID |
| D | High | ABNORMAL | High | ABNORMAL | High | High | INVALID | INVALID |

VEHICLE CONTROL APPARATUS

TECHNICAL FIELD

The present invention relates to a vehicle control apparatus of an automatic driving system.

BACKGROUND ART

In a case where abnormality is sensed in power supply voltage of a microcomputer of an electronic control unit (ECU) that controls operation of automatic driving or in microcomputer operation in an automatic driving system of a vehicle, appropriate subsequent processing is designed.

PTL 1 discloses a vehicle control apparatus that partially restricts control functions of a plurality of sub control apparatuses when the operation of a microcomputer of a main control apparatus is in a normal state and the power supply voltage of the microcomputer is outside a proper range.

Although not an automatic driving system, PTL 2 discloses a technique of appropriately notifying abnormality that has occurred in a microcomputer of an ECU that mediates driving forces in a hybrid vehicle having a plurality of driving power sources to the ECU that controls the driving sources, performing idling travel, emergency stop, or the like, to prevent occurrence of abnormality in the driving force.

CITATION LIST

Patent Literature

PTL 1: JP 2015-93498 A
PTL 2: JP 2015-63158 A

SUMMARY OF INVENTION

Technical Problem

An automatic driving system includes, for example, a main control apparatus that outputs a control instruction and a plurality of sub control apparatuses that individually performs engine control, brake control, power steering control, or the like, on the basis of the control instruction output from the main control apparatus.

Here, it would be desirable from the viewpoint of functional safety to enable an automatic driving system to sense a high pressure abnormality as well as a low pressure abnormality in the power supply voltage of an arithmetic processor (microcomputer) to perform failure processing. In a case where processing such as uniformly stopping (resetting) the arithmetic processor is performed in response to the abnormality in the power supply voltage, however, the function of the automatic driving system would be stopped.

If the function of the automatic driving system suddenly stops during operation, a vehicle occupant needs to take over the driving. However, since it takes time before the vehicle occupant takes over the driving, control interpolation by the vehicle system would be needed, and this leads to a request for techniques.

As a means for solving the above problem, PTL 1 describes control in a case where the power supply voltage of the microcomputer is outside a proper range while the operation of the microcomputer is in a normal state. Deviation of the power supply voltage of the microcomputer from the proper range, however, leads to a problem of affecting the reliability of arithmetic functions of the microcomputer.

In addition, in consideration of applying the technique described in PTL 2 to an automatic driving system, this technique merely performs idling travel, emergency stop, or the like, against power supply voltage abnormality of the automatic driving system and has difficulty in maintaining functions of the automatic driving system itself.

This leads to a concept of a method of shifting control from the main control apparatus to another automatic driving control apparatus in a case where the power supply voltage of the microcomputer performing the operation control of the automatic driving system is outside the proper range or in a case where abnormality is sensed in operation of the microcomputer.

However, an instruction value that would be received by the other automatic driving control apparatuses such as the engine control, the brake control, the power steering control in a case where abnormality is sensed in the main control apparatus is considered to be updated with a time lag, leading to a problem of difficulty in continuing seamless automatic driving control.

The present invention has been made in view of the above problems, and aims to provide a vehicle control apparatus capable of continuing a control function against abnormality in operation of an arithmetic processor or abnormality in the power supply voltage in a vehicle control apparatus and capable of improving reliability.

Solution to Problem

In order to achieve the above object, the present invention is configured as follows.

A vehicle control apparatus includes: a first control instruction unit that includes a first communication circuit and outputs a control instruction signal to an operation control unit of a vehicle via the first communication circuit; and a second control instruction unit that includes a second communication circuit and outputs a control instruction signal to the operation control unit via the second communication circuit in place of the first control instruction unit when abnormality occurs in an operation state of the first control instruction unit, in which in a case where abnormality is occurring in the operation state of the first control instruction unit or the second control instruction unit when a specific mode shift instruction for shifting the operation of the vehicle to a specific mode is input to the first control instruction unit, the first control instruction unit and the second control instruction unit prohibit the shift of the operation of the vehicle to the specific mode.

A vehicle control apparatus includes: a first control instruction unit that includes a first communication circuit and outputs a control instruction signal to an operation control unit of a vehicle via the first communication circuit; and a second control instruction unit that includes a second communication circuit and outputs a control instruction signal to the operation control unit via the second communication circuit in place of the first control instruction unit when abnormality occurs in an operation state of the first control instruction unit, in which in a case where abnormality occurs in the operation state of the first control instruction unit, the output of the first communication circuit is invalidated.

Advantageous Effects of Invention

According to the present invention, it is possible to realize a vehicle control apparatus capable of continuing a control function against abnormality in operation of an arithmetic processor or abnormality in the power supply voltage in a vehicle control apparatus and capable of improving reliability.

DESCRIPTION OF EMBODIMENTS

Embodiments of the present invention will be described below with reference to the accompanying drawings.

Exemplary Embodiments

First Exemplary Embodiment

Figure 1:
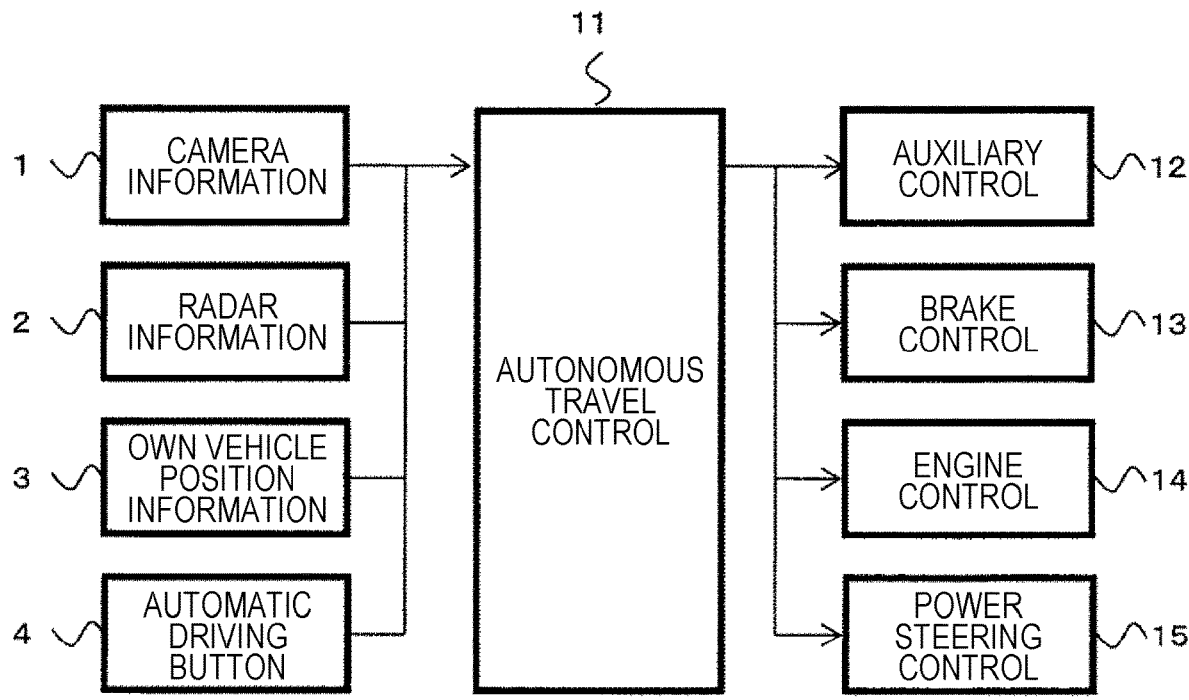
FIG. 1 is a schematic configuration diagram of an automatic driving system provided in a vehicle according to the present invention.

FIG. 1 is a schematic configuration diagram of an automatic driving system provided in a vehicle according to the present invention. In FIG. 1, the automatic driving system includes a camera (first sensor) 1, a radar (second sensor) 2, an own vehicle position sensor (third sensor) 3, as external state recognition sensors for recognizing external situations of the vehicle, and further includes an automatic driving button 4 for starting an automatic driving control mode.

The automatic driving system further includes: an autonomous travel control unit (first ECU (first control instruction unit)) 11; an auxiliary control unit (second ECU (second control instruction unit)) 12; a brake control unit (third operation control unit (third ECU)) 13; an engine control unit (fourth operation control unit (fourth ECU)) 14; and a power steering control unit (fifth operation control unit (fifth ECU)) 15.

The camera 1, the radar 2, the own vehicle position sensor 3, and the automatic driving button 4 are connected to the autonomous travel control unit 11. Sensor information from the camera 1, the radar 2, the own vehicle position sensor 3 and an automatic driving control mode request signal from the automatic driving button 4 are transmitted to the autonomous travel control unit 11.

Furthermore, the autonomous travel control unit 11, the auxiliary control unit 12, the brake control unit 13, the engine control unit 14, and the power steering control unit 15 are mutually connected to be communicable with each other via a controller area network (CAN).

Among the plurality of electronic control units (ECUs) 11, 12, 13, 14, and 15, the autonomous travel control unit 11 is an automatic driving vehicle travel control apparatus and the auxiliary control unit 12 is an auxiliary automatic driving vehicle travel control apparatus.

The brake control unit 13 is a control apparatus that performs brake control (braking force control) of a vehicle, and the engine control unit 14 is a control apparatus that controls an engine that generates driving force of the vehicle. The power steering control unit 15 is a control apparatus that controls power steering of the vehicle.

Here, when the autonomous travel control unit 11 receives a request for automatic driving made by using the automatic driving button 4, the autonomous travel control unit 11 calculates a moving route of the vehicle on the basis of external information such as information from the camera 1, the radar 2, and the own vehicle position sensor 3. Subsequently, the autonomous travel control unit 11 outputs control instructions for braking and driving force to the brake control unit 13, the engine control unit 14, and the power steering control unit 15 so as to move the vehicle in accordance with the route described above.

The brake control unit 13, the engine control unit 14, and the power steering control unit 15 receive a control instruction for automatic travel control from the autonomous travel control unit 11 and output operation signals to each of control targets (actuators).

In other words, the autonomous travel control unit 11 is a main control apparatus that outputs control instructions, while the brake control unit 13, the engine control unit 14, and the power steering control unit 15 are sub control apparatuses for controlling control targets in accordance with control instructions from the autonomous travel control unit 11.

The auxiliary control unit 12 is an auxiliary control apparatus for performing automatic driving control in place of the autonomous travel control unit 11 when the autonomous travel control unit 11 is in an abnormal state.

Figure 2:
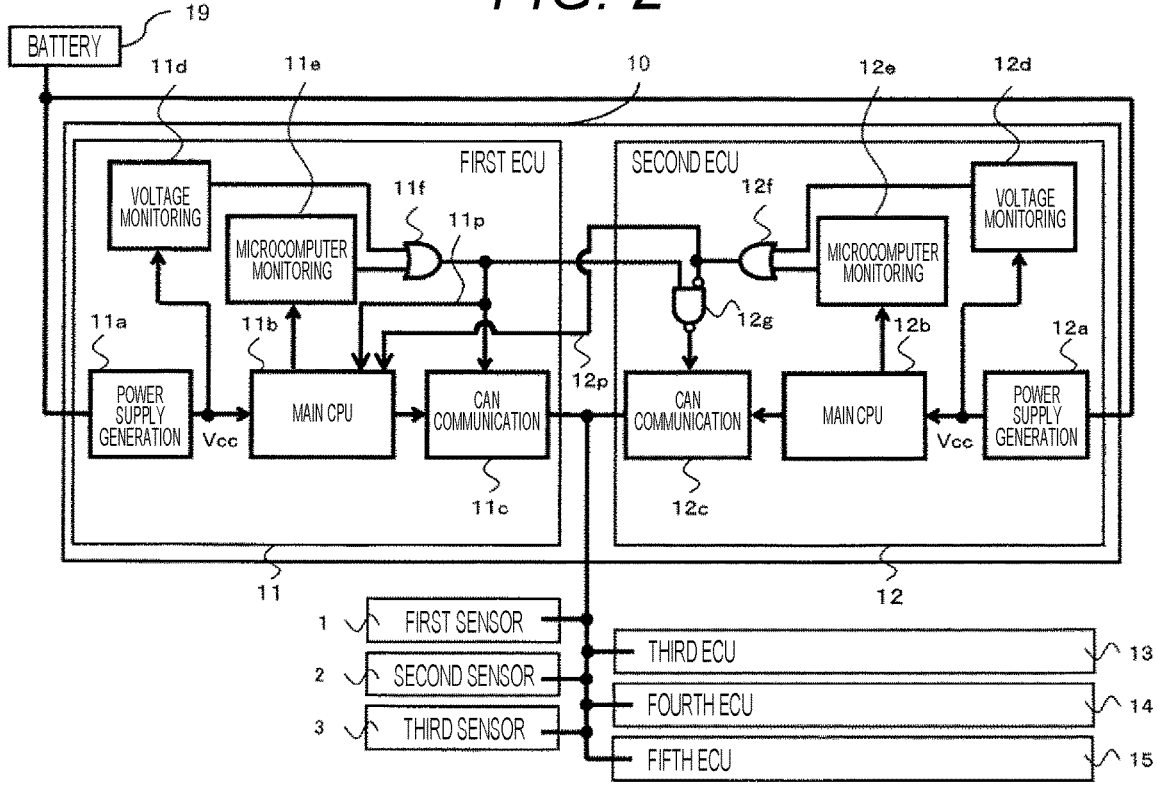
FIG. 2 is a diagram illustrating an internal configuration of an autonomous travel control unit and an auxiliary control unit that serves as an auxiliary at a time of abnormality of the autonomous travel control unit according to a first exemplary embodiment.

FIG. 2 is a diagram illustrating an internal configuration of the autonomous travel control unit 11 and the auxiliary control unit 12 that serves as an auxiliary at a time of abnormality of the autonomous travel control unit 11.

In FIG. 2, the autonomous travel control unit 11 being a control apparatus for automatic driving includes: a main power supply generation circuit 11a; a main CPU (arithmetic processor, microcomputer) 11b; a main communication circuit (first communication circuit (CAN communication circuit)) 11c; a power supply voltage monitoring circuit 11d; a CPU monitoring circuit (microcomputer monitoring circuit) 11e; and an OR gate 11f.

The main power supply generation circuit 11a is connected to a battery 19 mounted in the vehicle, lowers a battery voltage VB (for example, 12V) to a rated power supply voltage (for example, 5V) of the main CPU 11b and outputs the generated voltage as a power supply voltage Vcc for the CPU 11b.

The power supply voltage monitoring circuit 11d monitors the power supply voltage Vcc output from the main power supply generation circuit 11a and detects whether or not abnormality (operation state abnormality) is occurring in the power supply voltage Vcc. Specifically, the power supply voltage monitoring circuit 11d detects the presence or absence of low voltage abnormality in which the power supply voltage Vcc lowers below a proper voltage range and the presence or absence of high voltage abnormality in which the power supply voltage Vcc rises above the appropriate voltage range, and outputs the monitoring result to a first input terminal of the OR gate 11f.

Note that the power supply voltage monitoring circuit 11d can be configured to perform processing (outputting a reset signal) of resetting the main CPU 11b when detecting low voltage abnormality in which the power supply voltage Vcc is lower than the proper voltage range.

The CPU monitoring circuit 11e is, for example, a circuit for monitoring operation states of the main CPU 11b by using a program run signal output from the main CPU 11b, and outputs the monitoring result to a second input terminal of the OR gate 11f.

Note that the CPU monitoring circuit 11e can be configured to perform processing of resetting the CPU 11b (outputting a reset signal) when detecting abnormality in the operation state of the CPU 11b.

The CAN communication circuit 11c is a circuit for communicating with other ECUs 13, 14, 15 via the CAN. The CAN communication circuit 11c receives sensor information from the camera (first sensor) 1, the radar (second sensor) 2, and the own vehicle position sensor (third sensor) 3. The sensor information is then transmitted to the main CPU 11b via the CAN communication circuit 11c. Although not illustrated, the automatic driving control mode request from the automatic driving button 4 is also transmitted to the main CPU 11b via the CAN communication circuit 11c.

As described above, the monitoring result of the power supply voltage monitoring circuit 11d and the monitoring result of the CPU monitoring circuit 11e are input to the OR gate 11f. With the presence of abnormality in the monitoring result of either the power supply voltage monitoring circuit 11d or the CPU monitoring circuit 11e, an abnormality flag 11p as an output of the OR gate 11f indicates High (abnormal). With the absence of abnormality in the monitoring result of either the power supply voltage monitoring circuit 11d or the CPU monitoring circuit 11e, an output terminal of the OR gate 11f indicates Low (normal).

The output terminal of the OR gate 11f is connected to the communication circuit 11c and to an first input terminal of a NAND gate 12g of the auxiliary control unit 12.

The auxiliary control unit 12 has substantially the same configuration as that of the autonomous travel control unit 11 except for the NAND gate 12g, and includes: a main power supply generation circuit 12a connected to the battery 19; a main CPU (arithmetic processor, microcomputer) 12b; a main communication circuit (second communication circuit (CAN communication circuit)) 12c; a power supply voltage monitoring circuit 12d; a CPU monitoring circuit 12e; an OR gate 12f; and the above-described NAND gate 12g.

The main power supply generation circuit 12a, the main CPU (arithmetic processor, microcomputer) 12b, the CAN communication circuit 12c, the power supply voltage monitoring circuit 12d, and the CPU monitoring circuit 12e of the auxiliary control unit 12 perform similar operation to the power supply generation circuit 11a, the main CPU (arithmetic processor, microcomputer) 11b, the CAN communication circuit 11c, the power supply voltage monitoring circuit 11d, and CPU monitoring circuit 11e, respectively, of the autonomous travel control unit 11.

In the auxiliary control unit 12, the NAND gate 12g receives an inverted output value of the OR gate 12f and the output of the OR gate 11f of the autonomous travel control unit 11. An output terminal of the NAND gate 12g is connected to the CAN communication circuit 12c.

The output of the OR gate 12f is also supplied to the main CPU 11b of the autonomous travel control unit 11.

The CAN communication circuit 12c receives sensor information from the camera (first sensor) 1, the radar (second sensor) 2, and the own vehicle position sensor (third sensor) 3. The sensor information is then transmitted to the main CPU 12b via the CAN communication circuit 12c. Although not illustrated, the automatic driving control mode request from the automatic driving button 4 is also transmitted to the main CPU 12b via the CAN communication circuit 12c.

The autonomous travel control unit (first ECU (first control instruction unit)) 11 and the auxiliary control unit (second ECU (second control instruction unit)) 12 forma control instruction unit 10.

Figures 3, 4:
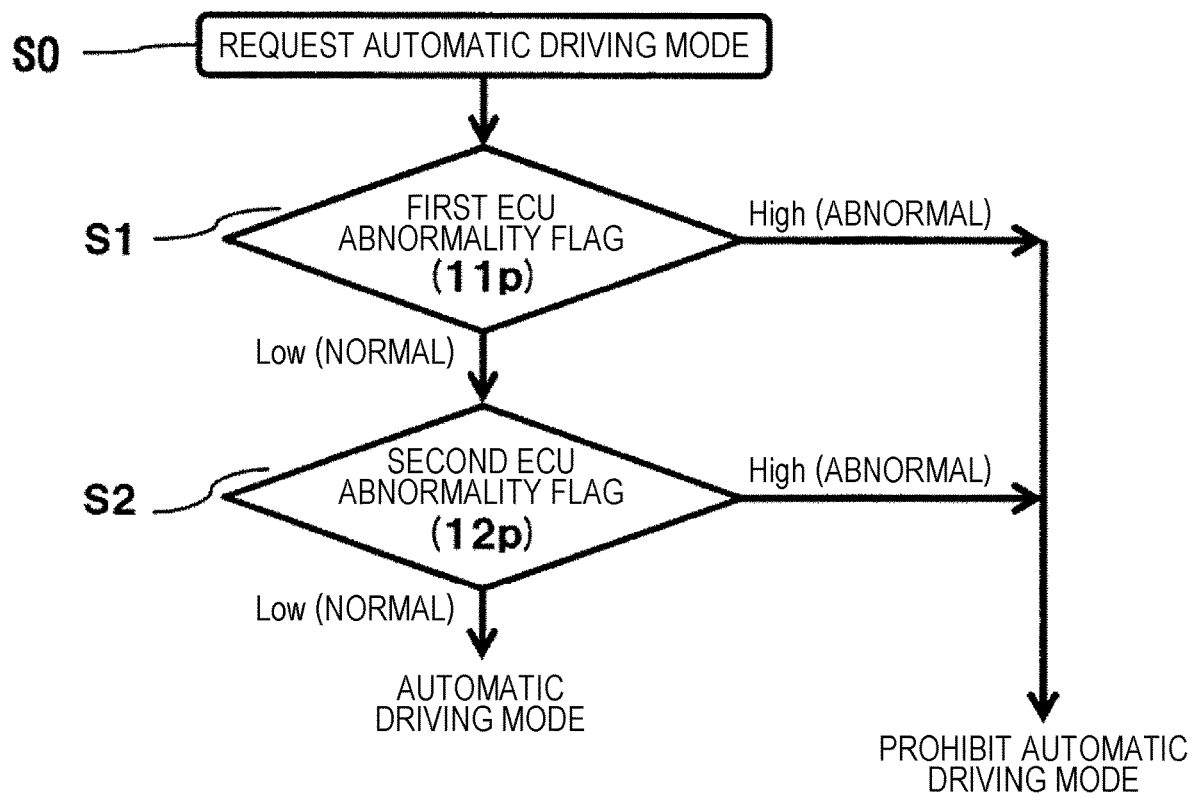
FIG. 3 is a diagram illustrating a determination flow for permitting or prohibiting an automatic driving control mode in a case where an automatic driving control mode request is made by using an automatic driving button according to the first exemplary embodiment.
FIG. 4 is a table comparatively illustrating a state of an abnormality flag and a state of output of a CAN communication circuit according to the first exemplary embodiment.

FIG. 3 is a diagram illustrating a determination flow for permitting or prohibiting an automatic driving control mode in a case where an automatic driving control mode request is made by using an automatic driving button 4.

As described above, abnormality signals of the autonomous travel control unit 11 and the auxiliary control unit 12, that is, abnormality signals 11p and 12p being respectively outputs of the OR gates 11f and 12f are input to the main CPU 11b of the autonomous travel control unit 11. The main CPU 11b makes a decision as to whether to permit or prohibit the automatic driving control mode on the basis of these two signals.

In step S0 of FIG. 3, in a case where an automatic driving control mode request is made by using the automatic driving button 4 and received, the main CPU 11b of the autonomous travel control unit 11 confirms the abnormality signal 11p in step S1. In a case where the abnormality signal 11p indicates High (abnormal), the autonomous travel control unit 11 and the auxiliary control unit 12 prohibit the automatic driving control mode (automatic driving control mode).

A method of prohibiting the automatic driving control mode includes prohibiting calculation of the control instruction value for automatic driving control of the main CPU 11b. Another method of prohibiting the automatic driving control mode is invalidating the output of the CAN communication circuits 11c and 12c, rather than prohibiting the calculation of the control instruction value for automatic driving control of the main CPU 11b.

In a case where the abnormality signal 11p indicates Low (normal) in step S1, the processing proceeds to the next step S2, and then, the main CPU 11b confirms the abnormality signal 12p from the auxiliary control unit 12, and prohibits the automatic driving control mode in a case where the abnormality signal 12p indicates High (abnormal). The reason is that when there is abnormality in the auxiliary control unit 12 in a case where the independent travel control unit 11 becomes abnormal after the vehicle enters the automatic driving control mode, the auxiliary control unit 12 might not be able to reliably execute the auxiliary function (automatic driving function).

Therefore, confirmation is performed for both the abnormality signal 11p of the autonomous travel control unit 11 and the abnormality signal 12p of the auxiliary control unit 12, and the automatic driving control mode is permitted when no abnormality is found in these units.

Next, output relationships between the abnormality signals 11p, 12p of the autonomous travel control unit 11 and the auxiliary control unit 12 and the CAN communication circuits 11c, 12c will be described with reference to FIG. 4.

FIG. 4 is a table illustrating states of the abnormality flags 11p and 12p in comparison with the states of the outputs of the CAN communication circuits 11c and 12c.

In the case of a state A where both the autonomous travel control unit 11 and the auxiliary control unit 12 are in normal states in FIG. 4, the abnormality signals 11p and 12p both indicate Low, the OR gate 11f indicates Low, and the output signal of the NAND gate 12g indicates High.

In the case of the state A, the output of the CAN communication circuit 11c is validated in accordance with the abnormality signals 11p and 12p, the output signal of the OR gate 11f, and the output signal of the NAND gate 12g, while the output of the CAN communication circuit 12c is invalidated. As a result, a control instruction value from the autonomous travel control unit 11 is notified to the brake control unit (third ECU) 13, the engine control unit (fourth ECU) 14, and the power steering control unit (fifth ECU) 15. In the state A, the main CPU 12b of the auxiliary control unit 12 calculates the control instruction values to the other ECUs 13 to 15 on the basis of the external information output from the first sensor 1 to the third sensor 3, and transmits the obtained control instruction value to the CAN communication circuit 12c. However, since the output of the CAN communication circuit 12c is invalidated, the control instruction value calculated by the main CPU 12b is not transmitted to the other ECUs 13 to 15.

In the state B, the abnormality flag 11p is High indicating abnormality, the abnormality flag 12p is Low indicating normality, the output signal of the OR gate 11f is High, and the output signal of the NAND gate 12g is Low. As a result, the output of the CAN communication circuit 11c is invalidated while the output of the CAN communication circuit 12c is validated.

In a case where the state is the state B before entering the automatic driving control mode, the automatic driving control mode is prohibited in accordance with the flow of FIG. 3. However, in a case where abnormality is detected in the autonomous travel control unit 11 after entering the automatic driving control mode in the flow of FIG. 3, the state transitions from the state A to the state B. At this time, since the abnormality flag 11p of the autonomous travel control unit 11 indicates High, the CAN communication circuit 11c is invalidated. On the other hand, in a case where the abnormality flag 12p of the auxiliary control unit 12 is normal, the NAND output 12g indicates Low and the CAN communication circuit 12c is validated. Accordingly, as described above, the control instruction value of the auxiliary control unit 12 is output from the CAN communication circuit 12c and then notified to each of the brake control unit (third ECU) 13, the engine control unit (fourth ECU) 14, and the power steering control unit (fifth ECU) 15.

As described above, in the state A, the main CPU 12b of the auxiliary control unit 12 executes calculation of the control instruction values to the other ECUs 13 to 15 on the basis of the external information from the first sensor 1 to the third sensor 3. Accordingly, it is possible to continue seamless automatic driving control with little time lag by validating the output of the CAN communication circuit 12c at the time of transition to the state B.

In the state C, the abnormality flag 11p is Low indicating normality, the abnormality flag 12p is High indicating abnormality, the output signal of the OR gate 11f is Low, the output signal of the NAND gate 12g is High. As a result, the output of the CAN communication circuit 11c is validated while the output of the CAN communication circuit 12c is invalidated.

In this state C, the control instruction value from the auxiliary control unit 12 is not output from the CAN communication circuit 11c, while the control instruction value from the autonomous travel control unit 11 is output from the CAN communication circuit 11c, and then, notified to each of the brake control unit (third ECU) 13, the engine control unit (fourth ECU) 14, and the power steering control unit (fifth ECU) 15.

In a case where the state is the state C before entering the automatic driving control mode, the automatic driving control mode is also suppressed in accordance with the flow of FIG. 3. However, in a case where abnormality is detected in the auxiliary control unit 12 after entering the automatic driving control mode in the flow of FIG. 3, the state transitions from the state A to the state C, whereas the abnormality flag 11p of the autonomous travel control unit 11 maintains Low, and the CAN communication circuit 11c remains validated.

On the other hand, in a case where the abnormality flag of the auxiliary control unit 12 is High indicating abnormality, the NAND output 12g indicates High and the CAN communication circuit 12c is invalidated. Accordingly, the control instruction value of the autonomous travel control unit 11 is notified to the brake control unit (third ECU) 13 or the like as described above.

In the state D, the abnormality flag 11p is High indicating abnormality, the abnormality flag 12p is also High indicating abnormality, the output signal of the OR gate 11f is also High, the output signal of the NAND gate 12g is also High, the output of the CAN communication circuit 11c is invalidated, and output of the CAN communication circuit 12c is also invalidated.

In a case where the state is the state D before entering the automatic driving control mode, the automatic driving control mode is also suppressed in accordance with the flow of FIG. 3. However, in a case where abnormality is detected in both the autonomous travel control unit 11 and the auxiliary control unit 12 after entering the automatic driving control mode in the flow of FIG. 3, the state transitions from the state A to the state D to invalidate the CAN communication circuits 11c and 12c.

As described above, the first exemplary embodiment of the present invention has a configuration for a case where the automatic driving control mode is requested, in which when the abnormality occurs in the auxiliary control unit 12, the mode would not shift to the automatic driving control mode not only in a case where abnormality occurs in the autonomous travel control unit 11 but also in a case where abnormality is not occurring in the autonomous travel control unit 11. In other words, the mode shifts to the automatic driving control mode only when no abnormality is occurring in the autonomous travel control unit 11 and the auxiliary control unit 12. With this configuration, it is possible to improve fail-safe functions for the automatic driving control of the vehicle.

Furthermore, the first exemplary embodiment of the present invention has a configuration including: the autonomous travel control unit 11 that performs automatic driving control of the vehicle; and the auxiliary control unit 12 that performs automatic driving control of the vehicle in a similar manner, in which the autonomous travel control unit 11 and the auxiliary control unit 12 calculate the control instruction values for automatic driving control, validate the CAN communication circuit 11c of the autonomous travel control unit 11, and invalidate the CAN communication circuit 12c of the auxiliary control unit 12 in a case where there is no abnormality in the main CPU 11b and the main CPU 12b of the autonomous travel control unit 11 and the auxiliary control unit 12 respectively, and invalidate the CAN communication circuit 11c of the autonomous travel control unit 11 and validate the CAN communication circuit 12c of the auxiliary control unit 12 in a case where the autonomous travel control unit 11 has abnormality and the auxiliary control unit 12 has no abnormality.

With this configuration, in a case where the auxiliary control unit 12 has no abnormality when the autonomous travel control unit 11 has abnormality during automatic driving control of the autonomous travel control unit 11, it is possible to continue seamless automatic driving control with substantially no time lag.

In the above-described example, the autonomous travel control unit 11 and the auxiliary control unit 12 are each separate ECUs (first ECU and second ECU). Alternatively, a configuration example in which the autonomous travel control unit 11 and the auxiliary control unit 12 are combined into the control instruction unit 10 as one ECU is also included in the first exemplary embodiment.

Second Exemplary Embodiment

Figure 5:
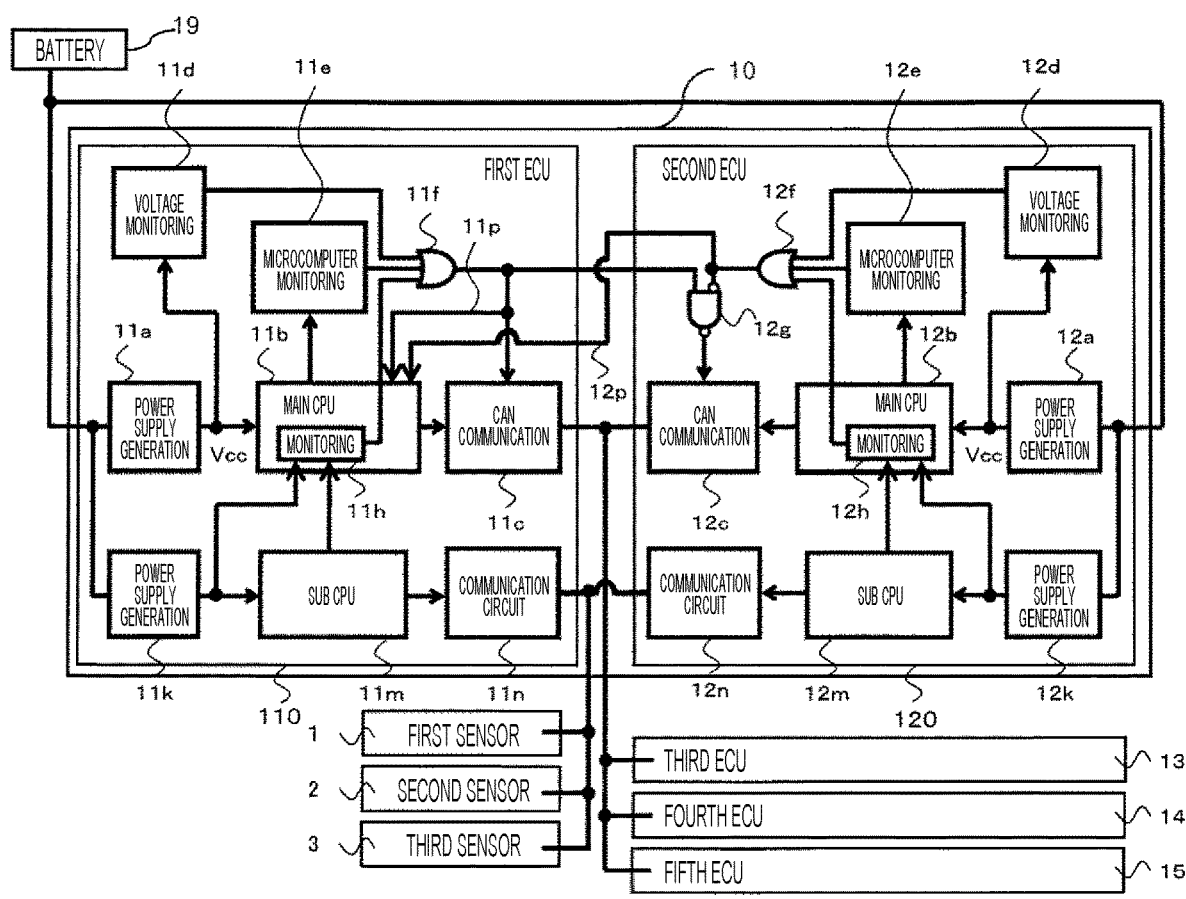
FIG. 5 is a diagram illustrating an internal configuration of an autonomous travel control unit and an auxiliary control unit that serves as an auxiliary at a time of abnormality of the autonomous travel control unit according to a second exemplary embodiment.

FIG. 5 is a diagram illustrating an internal configuration of an autonomous travel control unit 110 and an auxiliary control unit 120 that serves as an auxiliary at a time of abnormality of the autonomous travel control unit 110 according to a second exemplary embodiment of the present invention. The schematic configuration of the automatic driving system is equal to that of the first exemplary embodiment, and thus, illustration and description thereof will be omitted.

The autonomous travel control unit 110 in the second exemplary embodiment further includes a sub CPU (sub arithmetic processor) 11$m$ and a sub power supply generation circuit 11$k$ that outputs a voltage to the sub CPU 11$m$, and a sub communication circuit 11$n$ in addition to the internal configuration of the autonomous travel control unit 11 illustrated in FIG. 2. In addition, a monitoring unit 11$h$ is formed in the main CPU 11$b$.

The sub CPU 11$m$ receives sensor information from the camera (first sensor) 1, the radar (second sensor) 2, and the own vehicle position sensor (third sensor) 3, which are external state recognition sensors, via the sub communication circuit 11$n$. The sub CPU 11$m$ recognizes the situation of the external situation on the basis of the received sensor information and transmits external information to the main CPU 11$b$. The main CPU 11$b$ calculates a control instruction value for automatic driving control by using the external information transmitted from the sub CPU 11$m$.

In short, the functions performed by the main CPU 11$b$ in the first exemplary embodiment are performed by the main CPU 11$b$ and the sub CPU 11$m$ in the second exemplary embodiment, while recognition of the external situation is performed by the sub CPU 11$m$.

The monitoring unit 11$h$ diagnoses whether or not abnormality has occurred in the sub CPU 11$m$ and whether or not abnormality has occurred in the power supply voltage output from the sub power supply generation circuit 11$k$.

The monitoring result of the monitoring unit 11$h$ is output to a third input terminal of the OR gate 11$f$.

Other configurations of the autonomous travel control unit 110 are similar to those of the autonomous travel control unit 11.

The auxiliary control unit 120 according to the second exemplary embodiment further includes a sub power supply generation circuit 12$k$, a sub CPU 12$m$, and a sub communication circuit 12$n$ in addition to the internal configuration of the auxiliary control unit 12 illustrated in FIG. 2. In addition, a monitoring unit 12$h$ is formed in the main CPU 12$b$.

The sub CPU 12$m$ receives sensor information from the camera (first sensor) 1, the radar (second sensor) 2, and the own vehicle position sensor (third sensor) 3 via the sub communication circuit 12$n$. The sub CPU 12$m$ recognizes the situation of the external situation on the basis of the received sensor information and transmits external information to the main CPU 12$b$. The main CPU 12$b$ calculates a control instruction value for automatic driving control by using the external information transmitted from the sub CPU 12$m$.

Similarly to the autonomous travel control unit 110, the functions performed by the main CPU 12$b$ in the first exemplary embodiment are performed by the main CPU 12$b$ and the sub CPU 12$m$ in the second exemplary embodiment, while recognition of the external situation is performed by the sub CPU 12$m$.

The monitoring unit 12$h$ detects (monitors) whether or not abnormality has occurred in the sub CPU 12$m$ and whether or not abnormality has occurred in the power supply voltage output from the sub power supply generation circuit 12$k$.

The monitoring result of the monitoring unit 12$h$ is output to a third input terminal of the OR gate 12$f$.

Other configurations of the autonomous travel control unit 120 are similar to those of the auxiliary control unit 12.

Even in a case where the automatic driving control mode request is made by using the automatic driving button 4 in the second exemplary embodiment, operation is similar to that of the determination flow illustrated in FIG. 3. However, in step S1 of FIG. 3, the abnormality flag 11$p$ indicates Low and is judged as normal when all of the main CPU 11$b$, the power supply generation circuit 11$a$, the sub CPU 11$m$, and the sub power supply generation circuit 11$k$ are normal, while the abnormality flag 11$p$ indicates High and judged to be abnormal when at least any one of these is abnormal.

Similarly, in step S2 of FIG. 3, the abnormality flag 12$p$ indicates Low and is judged as normal when all of the main CPU 12$b$, the power supply generation circuit 12$a$, the sub CPU 12$m$, and the sub power supply generation circuit 12$k$ are normal, while the abnormality flag 12$p$ indicates High and judged to be abnormal when at least one of these is abnormal.

Moreover, also in the table illustrated in FIG. 4 in the case of the second exemplary embodiment, the abnormality flag 12$p$ is Low indicating normality when all of the main CPU 12$b$, the power supply generation circuit 12$a$, the sub CPU 12$m$, and the sub power supply generation circuit 12$k$ are normal, while the abnormality flag 12$p$ indicates High indicating abnormality when at least one of these is abnormal.

According to the second exemplary embodiment of the present invention, similar effect to that in the first exemplary embodiment can be obtained. The second exemplary embodiment can be applied in a case where it is difficult to execute two types of operation, that is, recognition of external situations on the basis of the sensor information and calculation of the control instruction value for the automatic driving control with one CPU, unlike the first exemplary embodiment.

In the above-described example, the autonomous travel control unit 110 and the auxiliary control unit 120 are each separate ECUs (first ECU and second ECU). Alternatively, a configuration example in which the autonomous travel control unit 110 and the auxiliary control unit 120 are combined into the control instruction unit 10 as one electronic control unit (ECU) is also included in the second exemplary embodiment.

The first and second exemplary embodiments described above have a configuration in which judgment is abnormal in a case where the abnormality flag 11p is High, and communication of the CAN communication circuit 11c is invalidated. Alternatively, it is possible to include a configuration in which the main CPU 11b stops the automatic driving control operation even when the CAN communication circuit 11c is validated, in the embodiment of the present invention.

Similarly, provided is a configuration in which judgment is abnormal in a case where the abnormality flag 12p is High, and communication of the CAN communication circuit 12c is invalidated. Alternatively, it is possible to include a configuration in which the main CPU 12b stops the automatic driving control operation even when the CAN communication circuit 12c is validated, in the embodiment of the present invention.

Furthermore, a configuration in which judgment is abnormal in a case where the abnormality flag 11p or 12p is High, and communication of the CAN communication circuit 11c or 12c is invalidated, and the main CPU 11b or 12b stops the automatic driving control operation is also included in the embodiment of the present invention.

Furthermore, the present invention is applicable not only to the automatic driving control mode but also to a fuel economy control mode and a collision safety control mode.

In the case of the fuel economy control mode, stop and start of the engine is controlled on the basis of external information from the first sensor 1, the second sensor 2, and the third sensor 3, for example, on the basis of traffic signal indication information at intersections. In this operation, the validity/invalidity of the CAN circuits 11c and 12c is switched similarly to the operations illustrated in FIGS. 3 and 4.

In the case of the collision safety control mode, braking operation is controlled on the basis of the external information from the first sensor 1, the second sensor 2, and the third sensor 3, for example, on the basis of inter-vehicle distance information with the preceding vehicle. In this operation, the validity/invalidity of the CAN circuits 11c and 12c is switched similarly to the operations illustrated in FIGS. 3 and 4.

In the present invention, the automatic driving control mode, the fuel economy control mode, and the collision safety control mode can be collectively referred to as a specific mode.

REFERENCE SIGNS LIST 1 camera
2 radar
3 own vehicle position sensor
4 automatic driving button
10 control instruction unit
11, 110 autonomous travel control unit
11a, 11k, 12a power supply generation circuit
11b, 12b main CPU (arithmetic processor)
11c, 12c CAN communication circuit
11d, 12d power supply voltage monitoring circuit
11e, 12e CPU monitoring circuit
11f, 12f OR gate
11h, 12h monitoring unit
11m, 12m sub CPU
11n, 12n communication circuit
12, 120 auxiliary control unit
12g NAND gate
13 brake control unit
14 engine control unit
15 power steering control unit

The invention claimed is:

1. A vehicle control apparatus comprising:
   a first control instruction unit that includes a first communication circuit and outputs a control instruction signal to an operation control unit of a vehicle via the first communication circuit;
   a second control instruction unit that includes a second communication circuit and outputs a control instruction signal to the operation control unit via the second communication circuit in place of the first control instruction unit when an abnormality occurs in an operation state of the first control instruction unit,
   wherein in a case where the abnormality is occurring in the operation state of the first control instruction unit or the second control instruction unit when a specific mode shift instruction for shifting the operation of the vehicle to a specific mode is input to the first control instruction unit, the first control instruction unit and the second control instruction unit prohibit the shift of the operation of the vehicle to the specific mode,
   wherein the specific mode is an automatic driving control mode; and
   wherein each of the first control instruction unit and the second control instruction unit includes:
     a main arithmetic processor that calculates a control instruction value in the automatic driving mode;
     a main power supply generation circuit that outputs a voltage to the main arithmetic processor;
     a microcomputer monitoring circuit that monitors the main arithmetic processor; and
     a voltage monitoring circuit that monitors the voltage of the main power supply generation circuit,
   wherein a timing of occurrence of the abnormality in each of operation state of the first control instruction unit and the second control instruction unit is a timing at which the microcomputer monitoring circuit detects occurrence of an operation abnormality of the main arithmetic processor in each of the first control instruction unit and the second control instruction unit, or a timing at which the voltage monitoring circuit detects occurrence of a voltage abnormality in the main power supply generation circuit.

2. The vehicle control apparatus according to claim 1, wherein the specific mode shift instruction is generated on the basis of an input from an operator of the vehicle.

3. The vehicle control apparatus according to claim 1, wherein, when the abnormality occurs in the first control instruction unit after the vehicle enters the automatic driving control mode, at least the output of the first communication circuit is invalidated.

4. The vehicle control apparatus according to claim 3, further comprising an external state recognition sensor that recognizes an external state of the vehicle,
   wherein each of the first control instruction unit and the second control instruction unit includes:
     a sub communication circuit to which sensor information from the external state sensor is supplied;
     a sub arithmetic processor that receives sensor information from the external state sensor via the sub communication circuit and recognizes external situations;
     a sub power supply generation circuit that outputs voltage to the sub arithmetic processor; and
     a monitoring unit formed inside the main arithmetic processor to monitor operation of the sub arithmetic processor and monitor the voltage of the sub power supply generation circuit, and when the monitoring unit detects occurrence of abnormality in the sub arithmetic processor after the vehicle enters the automatic driving control mode, at least the output of the first communication circuit is invalidated.

5. The vehicle control apparatus according to claim 3, wherein the output of the first communication circuit is invalidated while the output of the second communication circuit is validated, so as to enable the second control instruction unit to output a control instruction signal in place of the first control instruction unit, to the operation control unit via the second communication circuit.

6. The vehicle control apparatus according to claim 4, wherein the output of the first communication circuit is invalidated while the output of the second communication circuit is validated, so as to enable the second control instruction unit to output a control instruction signal in place of the first control instruction unit, to the operation control unit via the second communication circuit.

7. The vehicle control apparatus according to claim 5, wherein the output of the first communication circuit is invalidated while reception of the first communication circuit is validated.

8. The vehicle control apparatus according to claim 6, wherein the output of the first communication circuit is invalidated while reception of the first communication circuit is validated.

9. The vehicle control apparatus according to claim 1, wherein each of the first control instruction unit and the second control instruction unit is formed as a separate electronic control unit.

10. The vehicle control apparatus according to claim 1, wherein the first control instruction unit and the second control instruction unit are formed inside one electronic control unit.

11. A vehicle control apparatus comprising:
a first control instruction unit that includes a first communication circuit and outputs a control instruction signal to an operation control unit of a vehicle via the first communication circuit; and
a second control instruction unit that includes a second communication circuit and outputs a control instruction signal to the operation control unit via the second communication circuit in place of the first control instruction unit when an abnormality occurs in an operation state of the first control instruction unit,
wherein in a case where the abnormality occurs in the operation state of the first control instruction unit, the output of the first communication circuit is invalidated, and the operation state is associated with a specific mode which is an automatic driving control mode of the vehicle,
wherein each of the first control instruction unit and the second control instruction unit includes:
a main arithmetic processor that calculates a control instruction value in an automatic driving mode;
a main power supply generation circuit that outputs a voltage to the main arithmetic processor;
a microcomputer monitoring circuit that monitors the main arithmetic processor; and
a voltage monitoring circuit that monitors the voltage of the main power supply generation circuit, and
a timing of occurrence of the abnormality in each of operation state of the first control instruction unit and the second control instruction unit is a timing at which the microcomputer monitoring circuit detects occurrence of an operation abnormality of the main arithmetic processor in each of the first control instruction unit and the second control instruction unit, or a timing at which the voltage monitoring circuit detects occurrence of a voltage abnormality in the main power supply generation circuit.

12. The vehicle control apparatus according to claim 11, wherein, when the abnormality occurs in the first control instruction unit after the vehicle enters the automatic driving control mode, at least the output of the first communication circuit is invalidated.

13. The vehicle control apparatus according to claim 12, further comprising an external state recognition sensor that recognizes an external state of the vehicle,
wherein each of the first control instruction unit and the second control instruction unit includes:
a sub communication circuit to which sensor information from the external state sensor is supplied;
a sub arithmetic processor that receives sensor information from the external state sensor via the sub communication circuit and recognizes external situations;
a sub power supply generation circuit that outputs voltage to the sub arithmetic processor; and
a monitoring unit formed inside the main arithmetic processor to monitor operation of the sub arithmetic processor and monitor the voltage of the sub power supply generation circuit, and
when the monitoring unit detects occurrence of the abnormality in the sub arithmetic processor after the vehicle enters the automatic driving control mode, at least the output of the first communication circuit is invalidated.

14. The vehicle control apparatus according to claim 12, wherein the output of the first communication circuit is invalidated while the output of the second communication circuit is validated, so as to enable the second control instruction unit to output a control instruction signal in place of the first control instruction unit, to the operation control unit via the second communication circuit.

15. The vehicle control apparatus according to claim 13, wherein the output of the first communication circuit is invalidated while the output of the second communication circuit is validated, so as to enable the second control instruction unit to output a control instruction signal in place of the first control instruction unit, to the operation control unit via the second communication circuit.

16. The vehicle control apparatus according to claim 14, wherein the output of the first communication circuit is invalidated while reception of the first communication circuit is validated.

17. The vehicle control apparatus according to claim 15, wherein the output of the first communication circuit is invalidated while reception of the first communication circuit is validated.

18. The vehicle control apparatus according to claim 11, wherein each of the first control instruction unit and the second control instruction unit is formed as a separate electronic control unit.

19. The vehicle control apparatus according to claim 11, wherein the first control instruction unit and the second control instruction unit are formed inside one electronic control unit.

* * * * *